(12) United States Patent
Kim et al.

(10) Patent No.: US 10,970,735 B2
(45) Date of Patent: Apr. 6, 2021

(54) FACILITATING REWARD PROGRAM FOR CONSUMER TRANSACTIONS AND REDEMPTIONS OF DEAL OFFERS

(71) Applicant: Groupon, Inc., Chicago, IL (US)

(72) Inventors: Ben Kim, Sunnyvale, CA (US); Joshua Puckett, Palo Alto, CA (US); Andrey Zaytsev, Palo Alto, CA (US); Richard Park, San Francisco, CA (US); Hemant Bhonsle, Fremont, CA (US)

(73) Assignee: Groupon, Inc., Chicago, IL (US)

( * ) Notice: Subject to any disclaimer, the term of this patent is extended or adjusted under 35 U.S.C. 154(b) by 0 days.

(21) Appl. No.: 16/238,241

(22) Filed: Jan. 2, 2019

(65) Prior Publication Data
US 2019/0279245 A1   Sep. 12, 2019

Related U.S. Application Data

(63) Continuation of application No. 14/039,453, filed on Sep. 27, 2013, now abandoned.

(60) Provisional application No. 61/707,664, filed on Sep. 28, 2012, provisional application No. 61/715,765, filed on Oct. 18, 2012.

(51) Int. Cl.
*G06Q 30/02* (2012.01)

(52) U.S. Cl.
CPC ..... *G06Q 30/0226* (2013.01); *G06Q 30/0233* (2013.01)

(58) Field of Classification Search
None
See application file for complete search history.

(56) References Cited

U.S. PATENT DOCUMENTS

| | | | |
|---|---|---|---|
| 8,484,078 B1 * | 7/2013 | Mankoff | G06Q 30/0226 705/14.17 |
| 2006/0053056 A1 * | 3/2006 | Alspach-Goss | G06Q 30/0215 705/14.17 |
| 2010/0174596 A1 | 7/2010 | Gilman et al. | |
| 2011/0313840 A1 | 12/2011 | Mason et al. | |

OTHER PUBLICATIONS

U.S. Appl. No. 14/039,453, filed Sep. 27, 2013, Abandoned.

* cited by examiner

*Primary Examiner* — Azam A Ansari
(74) *Attorney, Agent, or Firm* — Alston & Bird LLP

(57) ABSTRACT

Provided herein are systems, methods, and computer readable storage media for facilitating registration of consumers in merchant rewards programs. In providing such functionality, the system can be configured to, for example, receive input of various consumer data, determine if the consumer data has already been registered in a rewards program, and if a consumer is not registered, facilitate the registration of the consumer in a merchant rewards program.

17 Claims, 12 Drawing Sheets

FACILITATING REWARD PROGRAM FOR CONSUMER TRANSACTIONS AND REDEMPTIONS OF DEAL OFFERS

CROSS-REFERENCE TO RELATED APPLICATIONS

The present application is a continuation of U.S. patent application Ser. No. 14/039,453, filed Sep. 27, 2013, now abandoned, which claims the benefit of the following co-owned provisional patent applications: (i) U.S. Provisional Application No. 61/707,664, entitled "Facilitating Reward Program for Consumer Transactions and Redemptions of Deal Offers", filed on Sep. 28, 2012, and (ii) U.S. Provisional Application No. 61/715,765, entitled "Facilitating Reward Program for Consumer Transactions and Redemptions of Deal Offers", filed on Oct. 18, 2012. The contents of each of the above-referenced patent applications are expressly incorporated by reference herein in their entirety.

FIELD

Embodiments of the invention relate, generally, to facilitating merchant reward programs for consumer transactions and redemptions of deal offerings.

BACKGROUND

Merchants sell goods and services (collectively referred to herein as "products") to consumers. The merchants can often control the form of their product offers, the timing of their product offers, and the price at which the products will be offered. The merchant may sell products at a brick-and-mortar sales location, a virtual online site, or both.

Discounts have been used as part of some retail strategies. Discount techniques include providing coupons and rebates to potential consumers, but these techniques have several disadvantages. In this regard, a number of deficiencies and problems associated with the systems used to, among other things, provide and redeem discounts used by consumers have been identified. Through applied effort, ingenuity, and innovation, many of these identified problems have been solved by developing solutions that are included in embodiments of the present invention, some examples of which are described herein.

BRIEF SUMMARY

Various example embodiments of the present invention are directed to systems, methods and computer readable storage media for facilitating merchant reward programs for consumer transactions and redemptions of deal offerings in a simple and user-friendly manner. Among other things, embodiments discussed herein can be configured to aid merchants in tracking consumer behavior and managing loyalty reward programs. In completing consumer transactions, merchant devices may be configured to determine if a consumer has registered for a rewards program and, if not, allow for simple registration of the consumer in the rewards program before completing the transaction. Merchant devices may also be configured to allow for simple registration of consumers in a reward program independent of a purchase transaction. Embodiments discussed herein can be configured to integrate this and other functionality into a single device that facilitates the implementation of various processes, which may run across one or more networks and utilize remote devices to complete a single point-of-sale transaction for a consumer.

In one embodiment, a method is provided that comprises receiving consumer data via an interface of a merchant device; determining whether the consumer data is registered or unregistered in a reward program; wherein when the consumer data is registered in the reward program, retrieving and displaying consumer reward status data on an interface of the merchant device; and wherein when the consumer data is unregistered in the reward program, receiving an indication to register the consumer data and registering the consumer data in the reward program.

BRIEF DESCRIPTION OF THE SEVERAL VIEWS OF THE DRAWINGS

Figure 1:
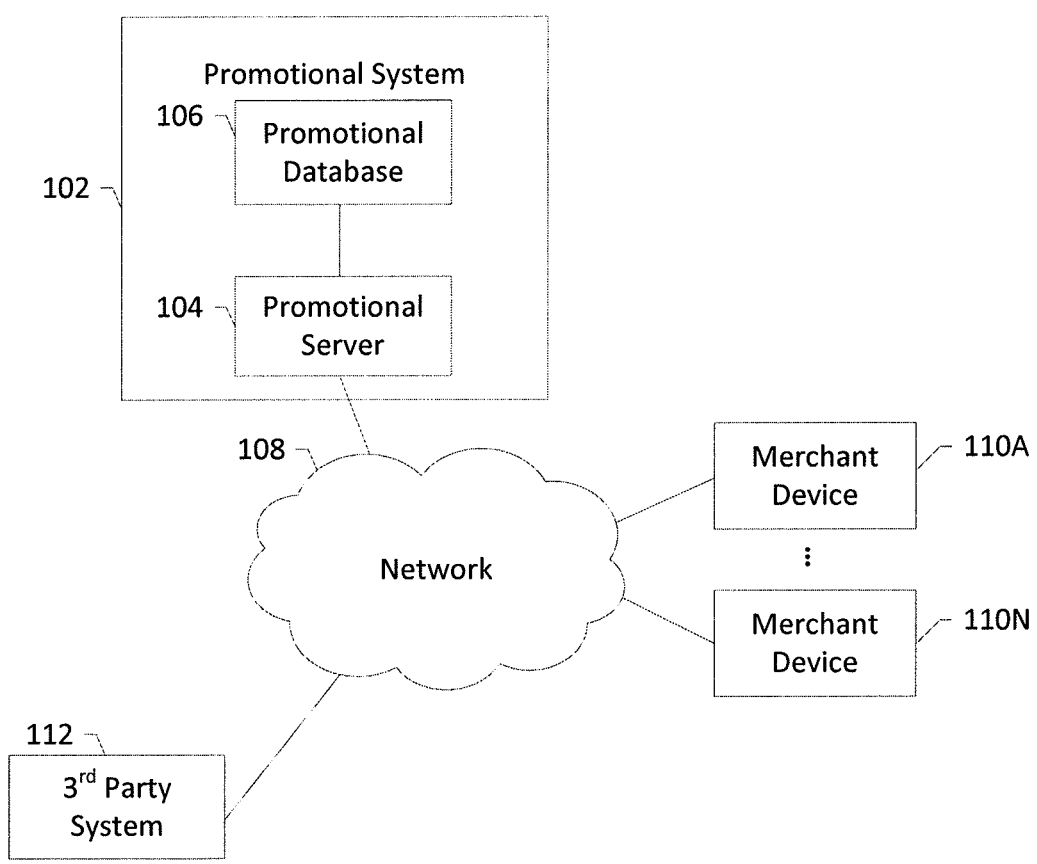
Figure 2:
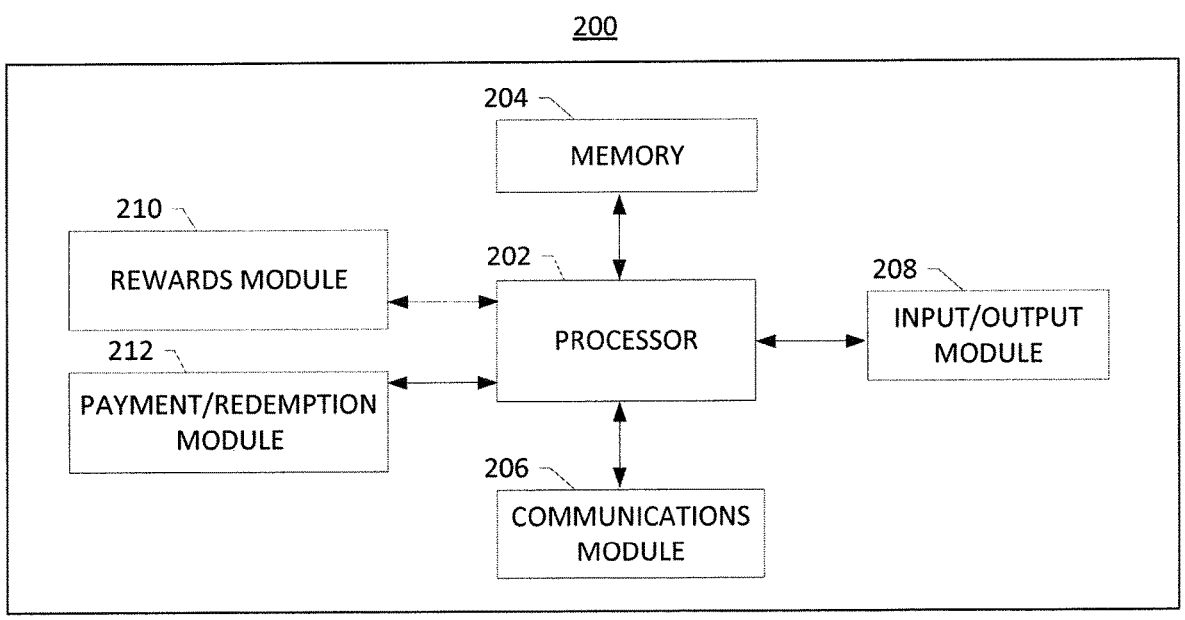
Figure 3:
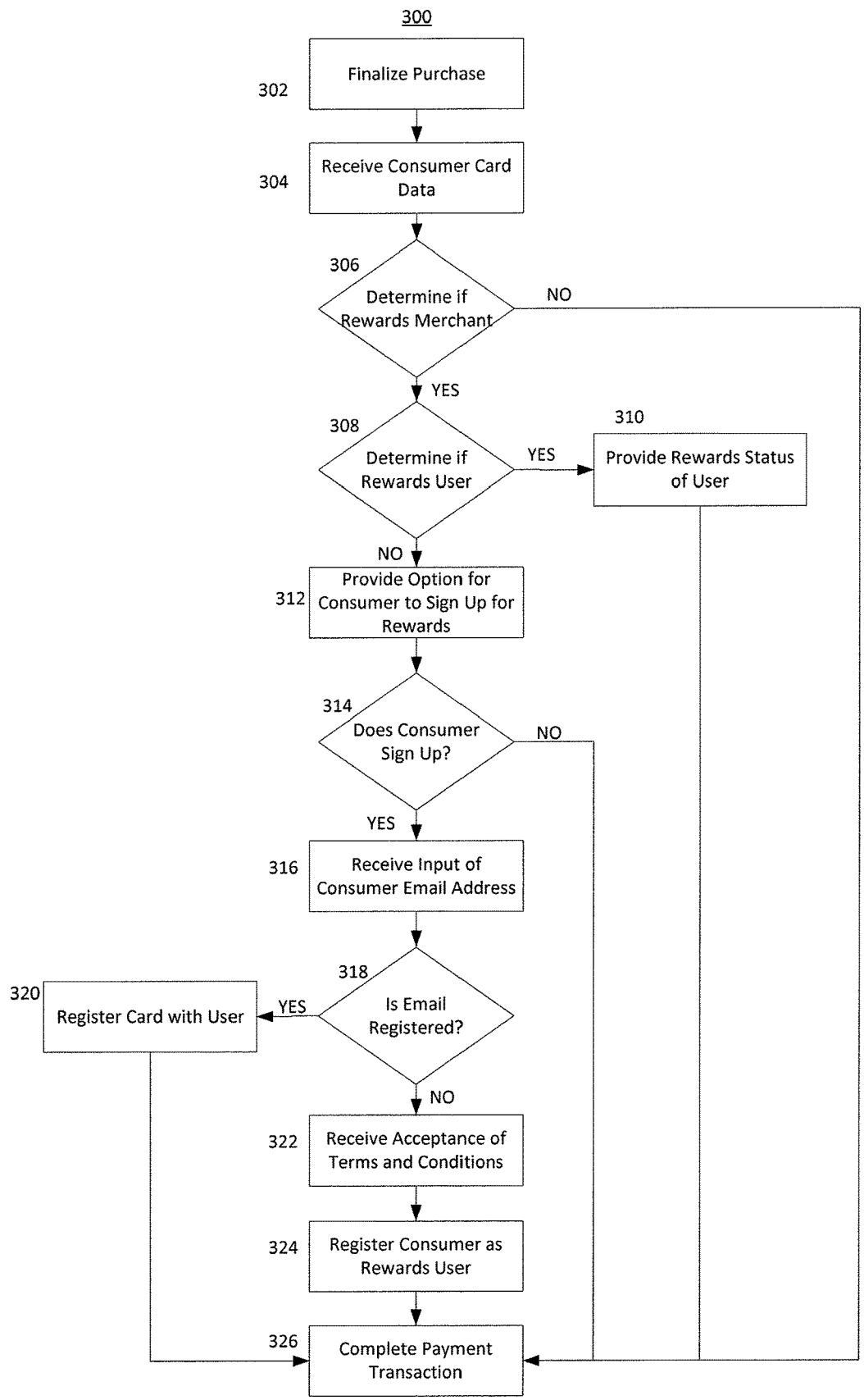
Figure 4:
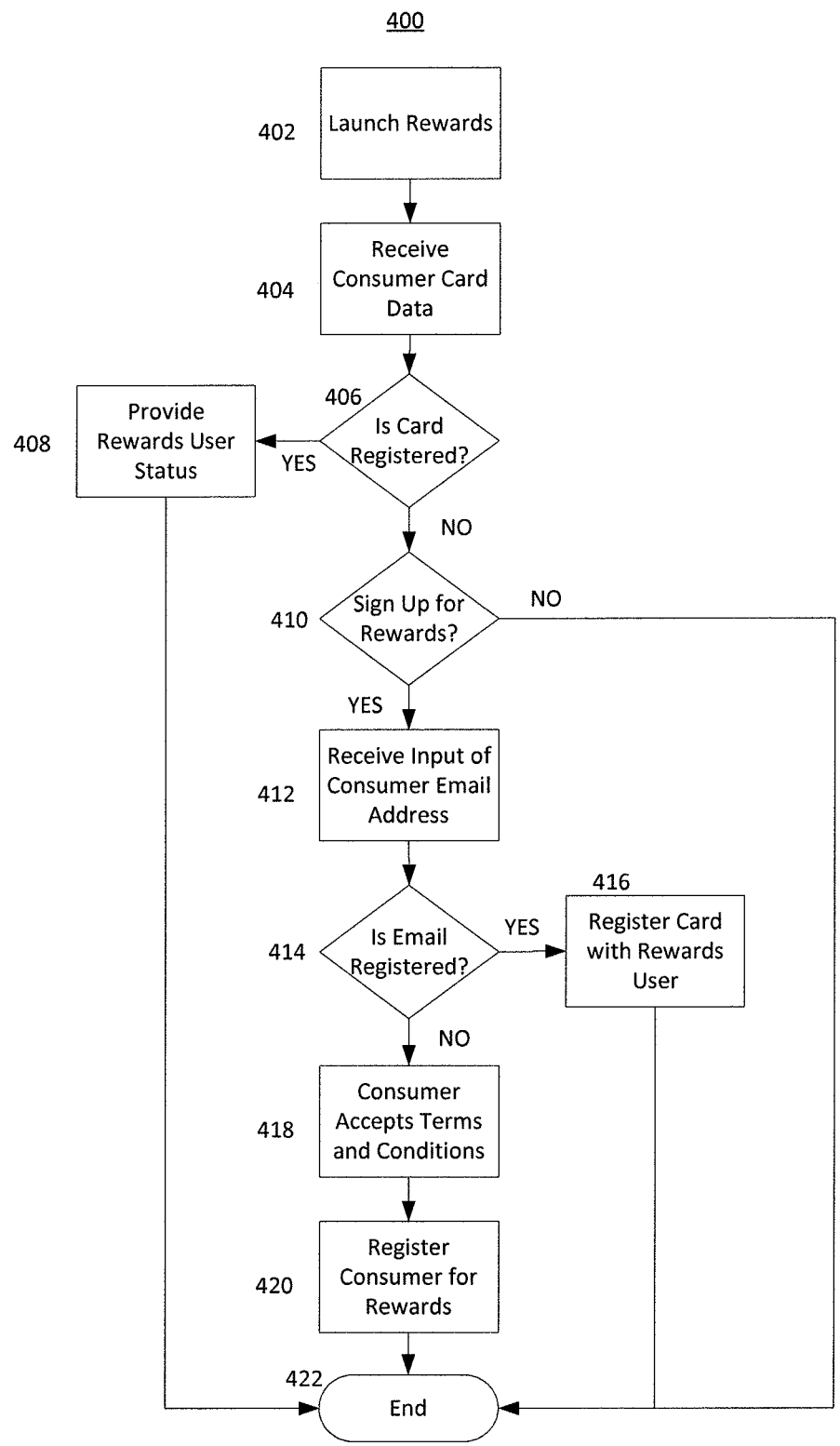
Figure 5:
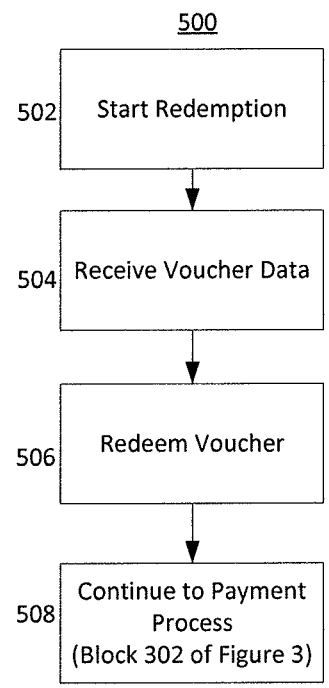
Figure 6:
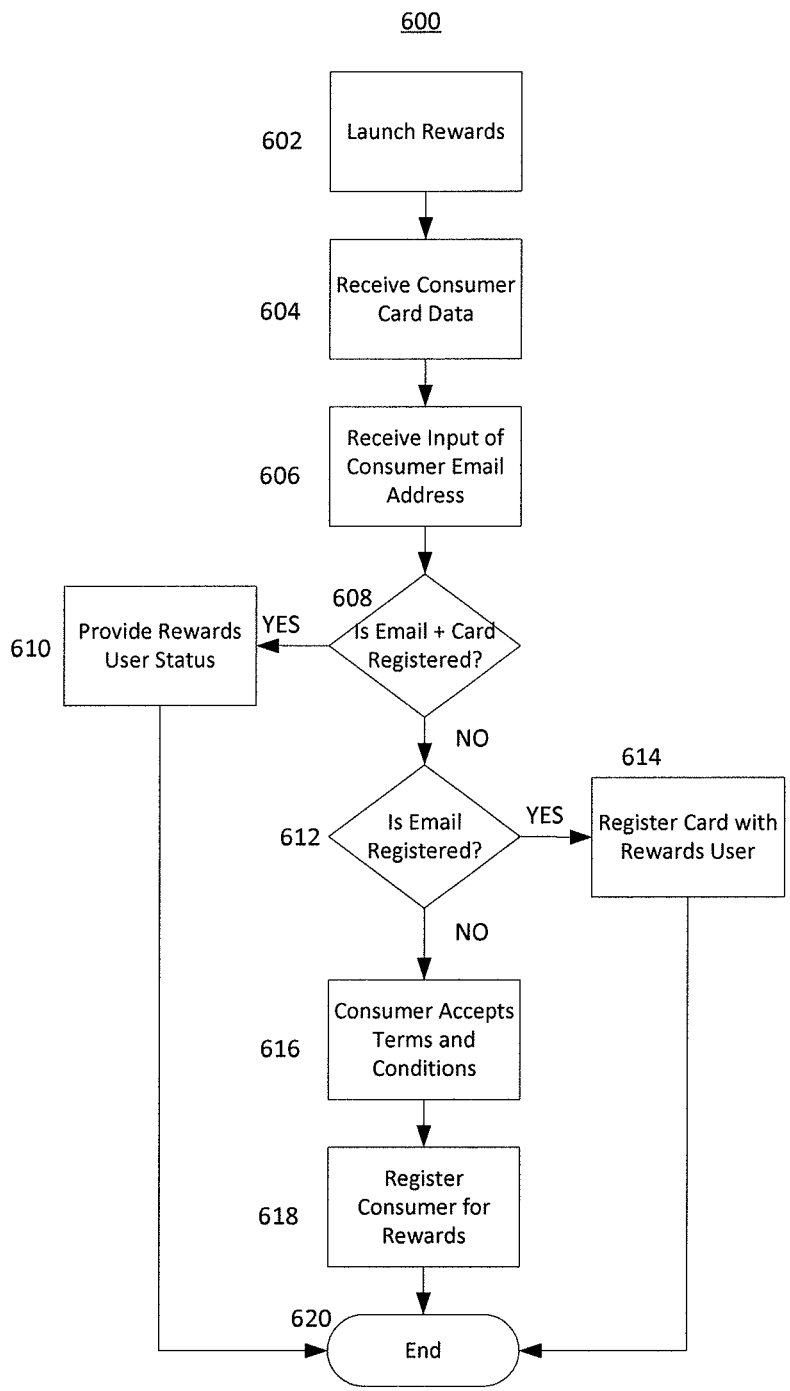
Figure 7:
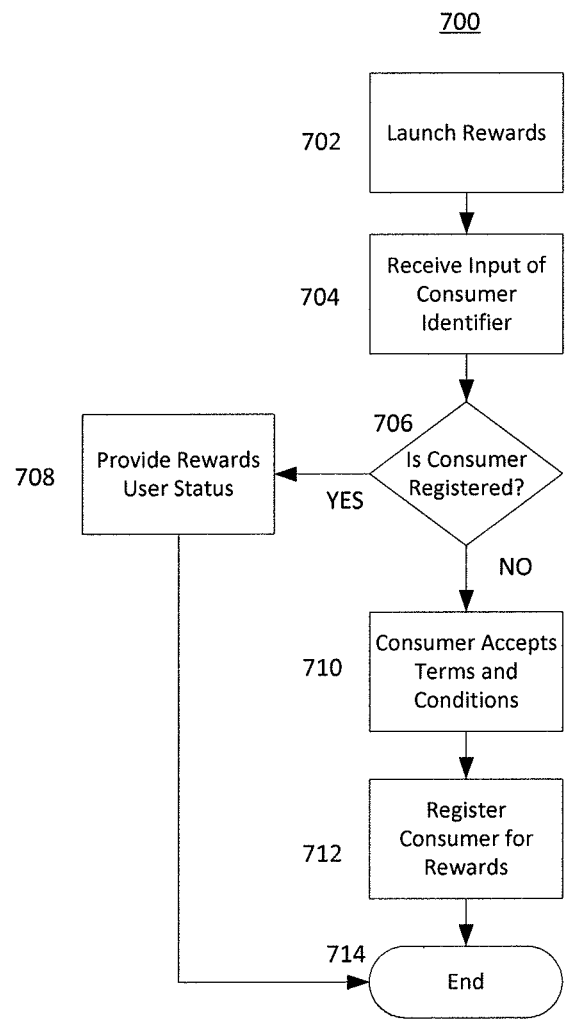
Figure 8:
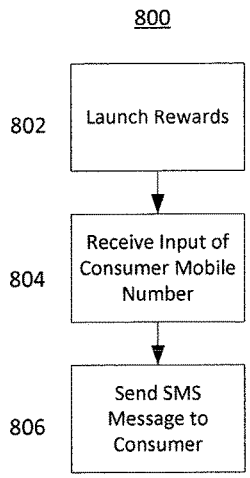
Figure 9:
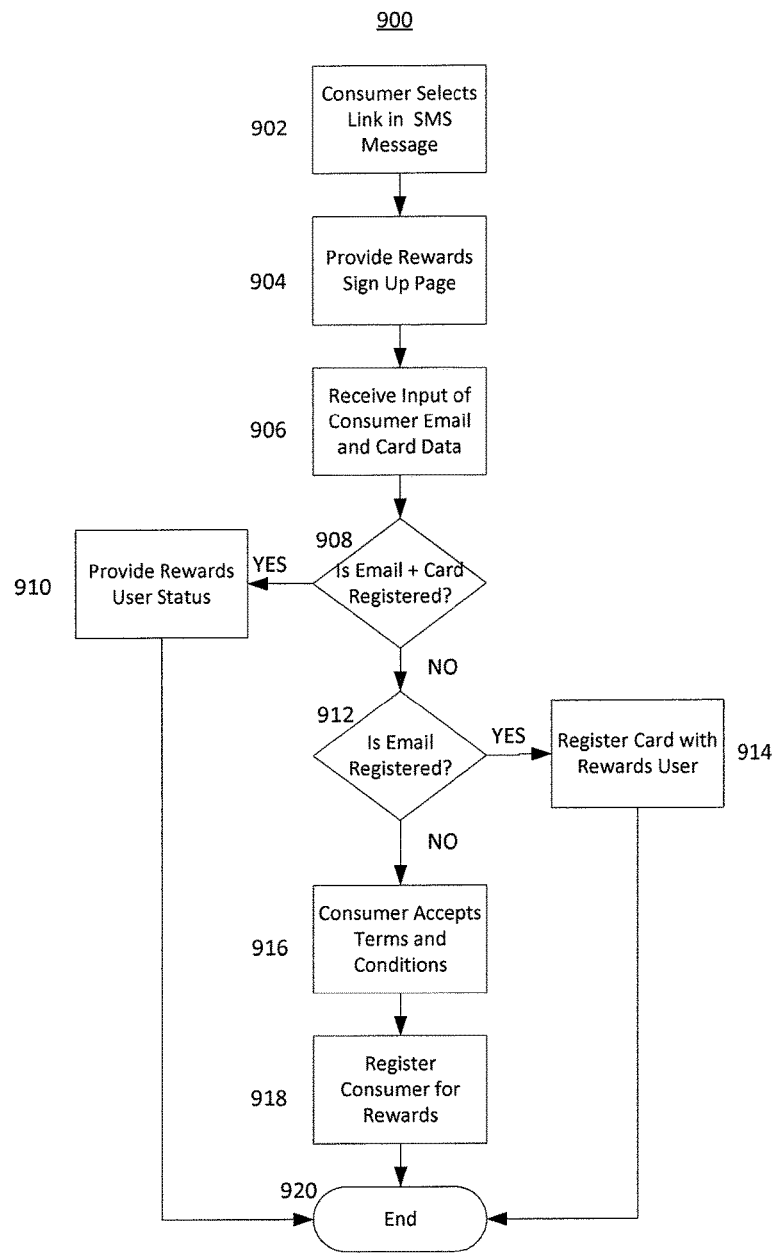
Figure 10:
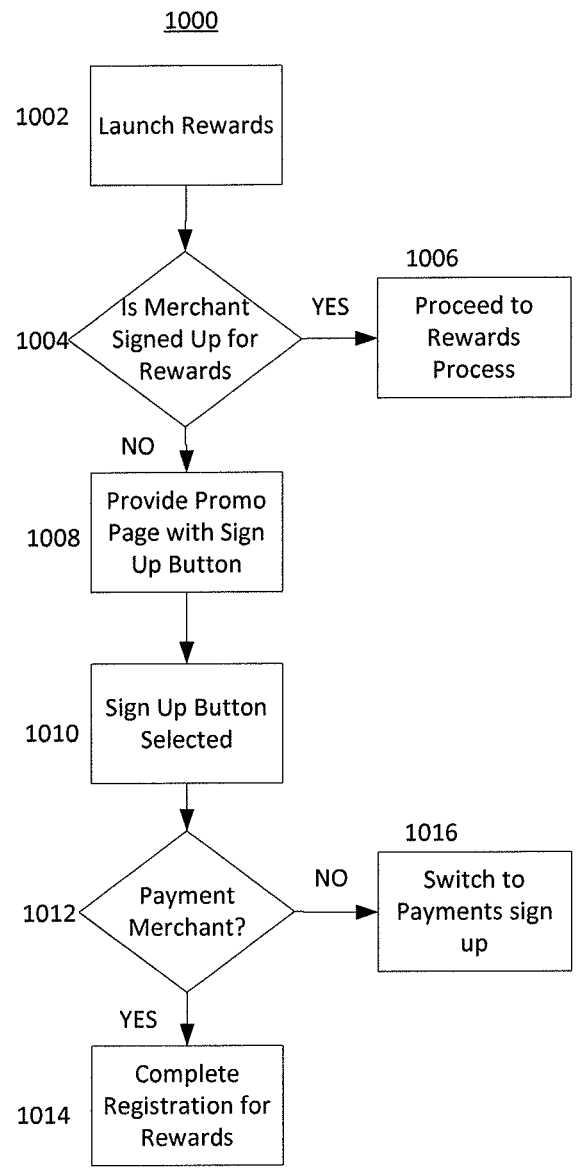

Having thus described embodiments of the invention in general terms, reference will now be made to the accompanying drawings, which are not necessarily drawn to scale, and wherein:

FIG. 1 shows an example system in accordance with some example embodiments discussed herein;

FIG. 2 shows a schematic block diagram of circuitry that can be included in a computing device, such as a merchant device and/or promotional system, in accordance with some example embodiments discussed herein;

FIG. 3 is a flowchart showing an exemplary process for facilitating registration of a consumer in a rewards program during a payment transaction in accordance with some example embodiments discussed herein;

FIG. 4 is a flowchart showing another exemplary process for facilitating registration of a consumer in a rewards program in accordance with some example embodiments discussed herein;

FIG. 5 is a flowchart showing an exemplary process for facilitating registration of a consumer in a rewards program during a redemption transaction in accordance with some example embodiments discussed herein;

FIG. 6 is a flowchart showing another exemplary process for facilitating registration of a consumer in a rewards program in accordance with some example embodiments discussed herein;

FIG. 7 is a flowchart showing another exemplary process for facilitating registration of a consumer in a rewards program in accordance with some example embodiments discussed herein;

FIGS. 8 and 9 are flowcharts showing an exemplary process for facilitating registration of a consumer in a rewards program using messaging in accordance with some example embodiments discussed herein;

FIG. 10 is a flowchart showing an exemplary process for registering merchants in a rewards management program in accordance with some example embodiments discussed herein; and FIGS. 11-20 show example graphical user interface displays that may be presented by various components of systems or devices in accordance with some example embodiments discussed herein.

DETAILED DESCRIPTION

Embodiments of the present invention now will be described more fully hereinafter with reference to the accompanying drawings, in which some, but not all embodiments of the inventions are shown. Indeed, embodiments of the invention may be embodied in many different forms and should not be construed as limited to the embodiments set forth herein; rather, these embodiments are provided so that this disclosure will satisfy applicable legal requirements. Like numbers refer to like elements throughout.

As used herein, the terms "data," "content," "information" and similar terms may be used interchangeably to refer to data capable of being captured, transmitted, received, displayed and/or stored in accordance with various example embodiments. Thus, use of any such terms should not be taken to limit the spirit and scope of the disclosure. Further, where a computing device is described herein to receive data from another computing device, it will be appreciated that the data may be received directly from the other computing device or may be received indirectly via one or more intermediary computing devices, such as, for example, one or more servers, relays, routers, network access points, base stations, and/or the like. Similarly, where a computing device is described herein to send data to another computing device, it will be appreciated that the data may be sent directly to the another computing device or may be sent indirectly via one or more intermediary computing devices, such as, for example, one or more servers, relays, routers, network access points, base stations, and/or the like.

FIGS. 11-20, detailed below, show example displays that may be presented by one or more display screens of one or more machines, sometimes referred to herein as "merchant devices," in accordance with some embodiments discussed herein. For example, the displays of FIGS. 11-20 can be presented to a merchant by a merchant device (such as a smart phone, tablet computer, etc.) and can aid in facilitating registration of consumers in a rewards program. Such displays and merchant devices may also aid in facilitating consumer transactions and redemption of a coupon and/or other discount offer for a merchant's product, which are sometimes referred to herein as "deal vouchers" or, more simply, "vouchers." Additional examples of merchant devices are discussed in connection with FIGS. 1 and 2 below.

The displays of FIGS. 11-20 can be used to provide a relatively simple, quick, and intuitive way for the merchant to register a consumer in a rewards program by using one or more third party machines, such as a promotional system or a third-party system. Additional examples of the promotional system are discussed in connection with FIGS. 1 and 2 below. Examples of more general systems and processes that can be used to create deal vouchers by/for a merchant and then be bought and redeemed by a consumer are discussed in commonly-assigned U.S. Patent Application Publication No. 2011/0313840, filed Mar. 17, 2011, titled "SYSTEM AND METHODS FOR PROVIDING LOCATION BASED DISCOUNT RETAILING," which is hereby incorporated by reference in its entirety.

As used herein, the phrase "Payments Merchant" is used to refer to a merchant that is a participant in a Payments system for processing and clearing consumer purchase transactions. Additionally, the phrase "Rewards Merchant" is used to refer to a merchant that is a participant in a Rewards system (e.g. a consumer loyalty program) for tracking consumer interactions and providing incentives to consumers. However, it should be noted that the terms are not mutually exclusive, for example, a Payments Merchant may also be a Rewards Merchant.

FIG. 1 shows system 100 including an example network architecture for a retailing system, which may include one or more devices and sub-systems that are configured to implement some embodiments discussed herein. For example, system 100 may include promotional system 102, which can include, for example, promotional server 104 and promotional database 106, among other things (not shown). Promotional server 104 can be any suitable network server and/or other type of processing device. Promotional database 106 can be any suitable network database configured to store merchant and consumer data, deal offering data, deal voucher data, transaction data, redemption data, and/or reward data, such as that discussed herein. In this regard, promotional system 102 may include, for example, at least one backend data server, network database, cloud computing device, among other things.

Promotional system 102 may be coupled to one or more merchant devices 110A-110N via network 108. In this regard, network 108 may include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, etc.). For example, network 108 may include a cellular telephone, an 802.11, 802.16, 802.20, and/or WiMax network. Further, the network 108 may include a public network, such as the Internet, a private network, such as an intranet, or combinations thereof, and may utilize a variety of networking protocols now available or later developed including, such as, but not limited to, TCP/IP based networking protocols.

Merchant devices 110A-110N may each be implemented as a personal computer and/or other networked device, such as a cellular phone, tablet computer, mobile device, etc., that may be used for any suitable purpose in addition to processing transactions, buying deals and/or offering deals for sale. The depiction in FIG. 1 of "N" merchants is merely for illustration purposes. System 100 may also include at least one third-party system 112, such as a credit card payment processing system, among other things.

The contemplated methods, systems and apparatuses, such as described in regard to FIGS. 1-20, may allow for improved analytics of merchant and consumer trends and behaviors. Through the coordinated processing of deal voucher offerings and redemptions, payment transactions, and reward management, the promotional system and/or merchant system are able to gather greater and more detailed data on merchant and/or consumer behaviors and preferences and further gather information concerning the relationships between a consumer's purchasing transactions and the purchase and redemption of deal offers. The enhanced data capturing may provide valuable improvements in the generation and marketing of deal offers in a promotional system and/or merchant system, such as enabling better targeting of promotions or offers and faster responses to emerging purchasing trends. This enhanced data collection and analysis may include data such as the value and/or level of transactions when deal vouchers are redeemed, differences in purchasing and payment behaviors when deal offers are or are not available; changes in timing for payments and deal redemptions, behaviors and preferences for particular consumers in relation to particular merchants or categories of merchants, and various other types of data related to consumer purchasing behavior.

FIG. 2 shows a schematic block diagram of circuitry 200, some or all of which may be included in, for example, promotional system 102, and/or merchant devices 110A-110N. As illustrated in FIG. 2, in accordance with some example embodiments, circuitry 200 can includes various means, such as one or more processors 202, memories 204, communications modules 206, and/or input/output modules 206. In some embodiments, such as when circuitry 200 is included in merchant devices 110A-110N and/or promotional system 102, rewards module 210 and payment/redemption module 212 may also or instead be included. As referred to herein, "module" includes hardware, software and/or firmware configured to perform one or more particular functions. In this regard, circuitry 200 as described herein may be embodied as, for example, circuitry, hardware elements (e.g., a suitably programmed processor, combinational logic circuit, and/or the like), a computer program product comprising computer-readable program instructions stored on a non-transitory computer-readable medium (e.g., memory 204) that is executable by a suitably configured processing device (e.g., processor 202), or some combination thereof.

Processor 202 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 2 as a single processor, in some embodiments, processor 202 comprises a plurality of processors. The plurality of processors may be embodied on a single computing device or may be distributed across a plurality of computing devices collectively configured to function as circuitry 200. The plurality of processors may be in operative communication with each other and may be collectively configured to perform one or more functionalities of circuitry 200 as described herein. In an example embodiment, processor 202 is configured to execute instructions stored in memory 204 or otherwise accessible to processor 202. These instructions, when executed by processor 202, may cause circuitry 200 to perform one or more of the functionalities of circuitry 200 as described herein.

Whether configured by hardware, firmware/software methods, or by a combination thereof, processor 202 may comprise an entity capable of performing operations according to embodiments of the present invention while configured accordingly. Thus, for example, when processor 202 is embodied as an ASIC, FPGA or the like, processor 202 may comprise specifically configured hardware for conducting one or more operations described herein. As another example, when processor 202 is embodied as an executor of instructions, such as may be stored in memory 204, the instructions may specifically configure processor 202 to perform one or more algorithms and operations described herein, such as those discussed in connection with FIGS. 3-10.

Memory 204 may comprise, for example, volatile memory, non-volatile memory, or some combination thereof. Although illustrated in FIG. 2 as a single memory, memory 204 may comprise a plurality of memory components. The plurality of memory components may be embodied on a single computing device or distributed across a plurality of computing devices. In various embodiments, memory 204 may comprise, for example, a hard disk, random access memory, cache memory, flash memory, a compact disc read only memory (CD-ROM), digital versatile disc read only memory (DVD-ROM), an optical disc, circuitry configured to store information, or some combination thereof. Memory 204 may be configured to store information, data (including deal parameter data, transaction data, and/or analytics data), applications, instructions, or the like for enabling circuitry 200 to carry out various functions in accordance with example embodiments of the present invention. For example, in at least some embodiments, memory 204 is configured to buffer input data for processing by processor 202. Additionally or alternatively, in at least some embodiments, memory 204 is configured to store program instructions for execution by processor 202. Memory 204 may store information in the form of static and/or dynamic information. This stored information may be stored and/or used by circuitry 200 during the course of performing its functionalities.

Communications module 206 may be embodied as any device or means embodied in circuitry, hardware, a computer program product comprising computer readable program instructions stored on a computer readable medium (e.g., memory 204) and executed by a processing device (e.g., processor 202), or a combination thereof that is configured to receive and/or transmit data from/to another device, such as, for example, a second circuitry 200 and/or the like. In some embodiments, communications module 206 (like other components discussed herein) can be at least partially embodied as or otherwise controlled by processor 202. In this regard, communications module 206 may be in communication with processor 202, such as via a bus. Communications module 206 may include, for example, an antenna, a transmitter, a receiver, a transceiver, network interface card and/or supporting hardware and/or firmware/software for enabling communications with another computing device. Communications module 206 may be configured to receive and/or transmit any data that may be stored by memory 204 using any protocol that may be used for communications between computing devices. Communications module 206 may additionally or alternatively be in communication with the memory 204, input/output module 208 and/or any other component of circuitry 200, such as via a bus.

Input/output module 208 may be in communication with processor 202 to receive an indication of a user input and/or to provide an audible, visual, mechanical, or other output to a user (e.g., merchant and/or consumer). Some example visual outputs that may be provided to a user by circuitry 200 are discussed in connection with FIGS. 11-20. As such, input/output module 208 may include support, for example, for a keyboard, a mouse, a joystick, a display, a touch screen display, a microphone, a speaker, a RFID reader, barcode reader, biometric scanner, and/or other input/output mechanisms. In embodiments wherein circuitry 200 is embodied as a server or database, aspects of input/output module 208 may be reduced as compared to embodiments where circuitry 200 is implemented as an end-user machine (e.g., consumer device and/or merchant device) or other type of device designed for complex user interactions. In some embodiments (like other components discussed herein), input/output module 208 may even be eliminated from circuitry 200. Alternatively, such as in embodiments wherein circuitry 200 is embodied as a server or database, at least some aspects of input/output module 208 may be embodied on an apparatus used by a user that is in communication with circuitry 200, such as for example, merchant device 110. Input/output module 208 may be in communication with the memory 204, communications module 206, and/or any other component(s), such as via a bus. Although more than one input/output module and/or other component can be included in circuitry 200, only one is shown in FIG. 2 to avoid overcomplicating the drawing (like the other components discussed herein).

Rewards module 210 may also or instead be included and configured to perform the functionality discussed herein related to facilitating registration of consumers and rewards management discussed herein. In some embodiments, some or all of the functionality facilitating registration of consumers and rewards management may be performed by processor 202. In this regard, the example processes and algorithms discussed herein can be performed by at least one processor 202 and/or rewards module 210. For example, non-transitory computer readable storage media can be configured to store firmware, one or more application programs, and/or other software, which include instructions and other computer-readable program code portions that can be executed to control each processor (e.g., processor 202 and/or rewards module 210) of the components of system 100 to implement various operations, including the examples shown below. As such, a series of computer-readable program code portions are embodied in one or more computer program products and can be used, with a computing device, server, and/or other programmable apparatus, to produce machine-implemented processes.

Payment/redemption module 212 may also be included and configured to perform the functionality discussed herein related to facilitating payment transactions and redemption of deal vouchers. In some embodiments, some or all of the functionality facilitating payment transactions and redemption of deal vouchers may be performed by processor 202. In this regard, the example processes and algorithms discussed herein can be performed by at least one processor 202 and/or payment/redemption module 212. For example, non-transitory computer readable storage media can be configured to store firmware, one or more application programs, and/or other software, which include instructions and other computer-readable program code portions that can be executed to control each processor (e.g., processor 202 and/or payment/redemption module 212) of the components of system 100 to implement various operations. As such, a series of computer-readable program code portions are embodied in one or more computer program products and can be used, with a computing device, server, and/or other programmable apparatus, to produce machine-implemented processes.

As will be appreciated, any such computer program instructions and/or other type of code may be loaded onto a computer, processor or other programmable apparatus circuitry to produce a machine, such that the computer, processor, or other programmable circuitry that executes the code on the machine creates the means for implementing various functions, including those described herein.

It is also noted that all or some of the information presented by the example displays discussed herein can be based on data that is received, generated and/or maintained by one or more components of system 100. In some embodiments, one or more external systems (such as a remote cloud computing and/or data storage system) may also be leveraged to provide at least some of the functionality discussed herein.

FIG. 3 shows an exemplary process for rewards registration during a payment transaction, namely process 300, that may be executed by one or more machines (some examples of which are discussed in connection with FIGS. 1 and 2 above) to provide the displays of FIGS. 11-15 discussed below, among others, in accordance with some example embodiments discussed herein. Process 300 may start at 302 with a merchant finalizing a consumer purchase via a merchant device.

Figure 11:

At 302, process 300 may present a Transaction Checkout Display on a touch-sensitive display screen of a device, such as a merchant device, for use in facilitating a purchase transaction. One such example of the Transaction Checkout Display is provided by FIG. 11. A user may input purchase transaction data through the Transaction Checkout Display using a variety of input methods, such as a keypad of a touch-sensitive display included in merchant device, as shown in FIG. 11. A user may alternatively input purchase transaction data using other means such as barcode or optical scanners, etc. (not shown).

At 304, process 300 may receive consumer payment card data for use in settling the purchase transaction. For example, a user may input the consumer payment card data using a magnetic card reader in communication with the merchant device. Alternatively, a user may input consumer payment card data (e.g., credit card number, expiration date, security code, etc.) using a keypad, such as provided by a touch-sensitive display screen included in the merchant device.

At 306, a determination may be made as to whether the merchant participates in the rewards program. For example, the merchant device can be configured to communicate with another device, such as promotional system 102, to determine if the merchant is registered for the rewards program. If the merchant participates in the rewards program, process 300 may continue to 308. If the merchant is not participating in the rewards program, process 300 may continue to 326 to complete the payment transaction.

Alternatively, if the merchant is not participating in the rewards program, a promotional display for the rewards program may be displayed on the merchant device as described below with regard to FIG. 10 and as shown in the example display 1604 or FIG. 16. The promotional display may also provide for the non-participating merchant to register to participate in the rewards program.

At 308, a determination may be made as to whether the consumer payment card data is registered in a rewards program. For example, the merchant device can be configured to communicate with another device, such as promotional system 102, to determine if the consumer payment card data has been registered in a rewards program for a merchant. If the consumer payment card has already been registered with the rewards program, data regarding the consumer's reward progress may be retrieved and displayed on the merchant device at 310. For example, in some embodiments, data may be displayed for the merchant regarding the frequency of the consumer's visits, how much the consumer has spent in prior visits, the consumer's transaction, or the like.

Figure 12:
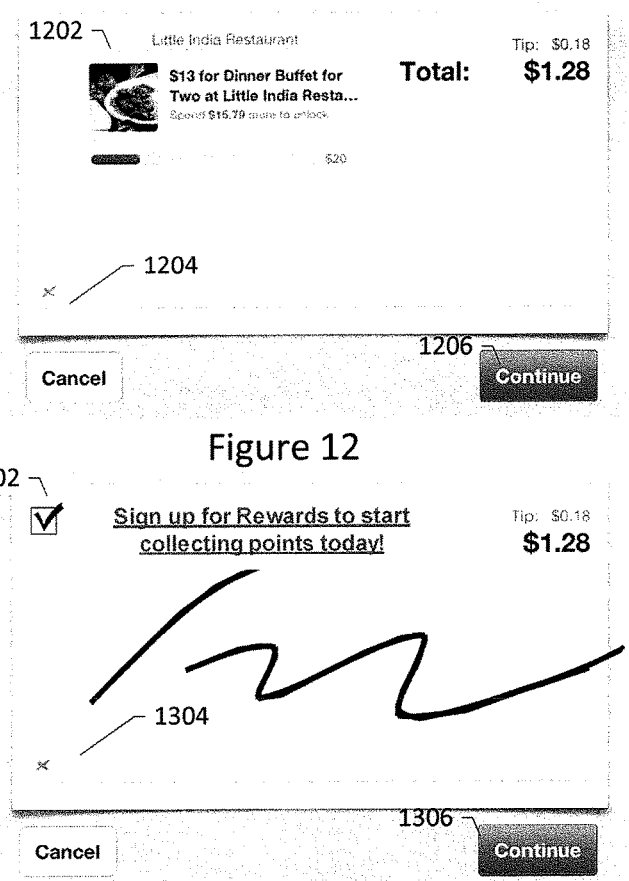

In some embodiments, data may be displayed for the consumer regarding reward progress. One example of a display of a consumer's reward progress is provided by 1202 of FIG. 12. As shown in FIG. 12, the display of the consumer's rewards progress may be included as part of the display of a confirmation screen to settle the purchase transaction. A user may authorize the transaction, such as by inputting a signature on a touch-screen display provided as part of the merchant device, for example on signature line 1204 of FIG. 12, and by selecting continue button 1206 of FIG. 12. Process 300 may then continue to 326 where the payment transaction is completed.

Figure 13:
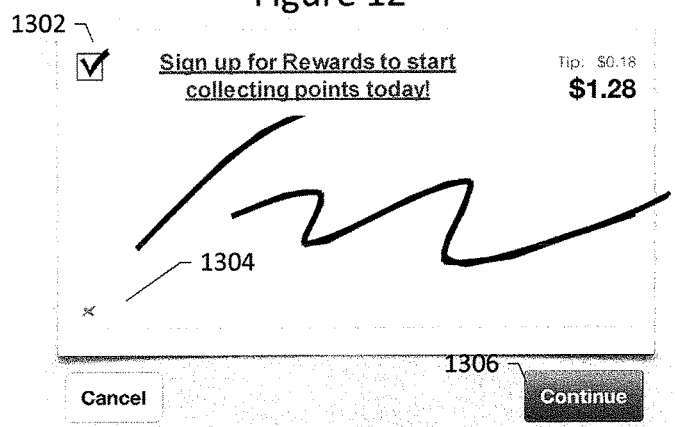

If at 308 it is determined that the consumer payment card is not registered in the rewards program, the merchant device may display an option for the consumer to register for the rewards program. One example of a display providing an option for the consumer to register is provided by FIG. 13, where the consumer may select checkbox 1302 to register for the rewards program. As shown in FIG. 13, the display may also provide for the input of a consumer's authorization for the payment transaction, such as by signature line 1304. A consumer may select continue button 1306 to indicate that the input is complete.

At 314, a determination may be made as to whether a consumer has input a selection to register for the rewards program. If it is determined that the user has not selected to register for the rewards program, process 300 may continue to 326 where the purchase transaction is completed.

If at 314 it is determined that the user has selected to register for the rewards program, input of consumer identifier data may be received to provide for the registration in the rewards program. For example, consumer identifiers may include data such as an email address, a user name, a phone number, an identification number, and/or any other consumer identifying information. One example of a display for inputting a consumer's email address is provided by FIG. 14. A user may input the email address through, for example, the use of a keypad presented on a touch-screen display of a merchant device.

At 318, a determination is made of whether the received consumer identifier data has previously been registered in the rewards program. For example, the merchant device can be configured to communicate with another device, such as promotional system 102, to determine if the consumer email address has previously been registered in a rewards program. If, at 318, it is determined that the consumer identifier data has previously been registered, the consumer payment card may be associated with that previous registration. Upon completion of the card registration, process 300 may continue to 326 where the purchase transaction is completed. At 326, a notification may be provided to indicate that the registration and payment transaction has been completed. One example of a display for notifying the process is complete is provided by FIG. 15.

If at 318, it is determined that the consumer identifier data has not been previously registered in the rewards program, process 300 may provide for input of a consumer's acceptance of the terms and conditions for the rewards program at 322.

Upon input of acceptance of the terms and conditions, process 300 may continue to 324 to complete the registration of the consumer in the rewards program. For example, the consumer's email address and payment card data may be stored, such as at database 106 of promotional system 102. The consumer's transaction data for a merchant may also be stored in association with the consumer's email address and payment card data, such as at promotional system 102. Process 300 may continue to 326 to complete the purchase transaction. At 326, a notification may be provided to indicate that the registration and payment transaction has been completed. One example of a display for notifying the process is complete is provided by FIG. 15.

Optionally, upon completion of the registration of a consumer in the rewards program, previous consumer transaction data associated with the provided consumer payment card data for the merchant may be retrieved, such as from promotional database 106 or another device such as third-party system 112. The retrieved consumer transaction data may then be associated with the consumer's registration in the rewards program. For example, in some embodiments, the consumer's past transaction data may be used to apply some or all of the past transactions to the consumer's reward progress, the consumer may be offered an incentive based on the past transactions, or the like.

In an exemplary embodiment of this process, a consumer may finish shopping and approach the merchant point-of-sale (POS) to checkout. The merchant may total the consumer's purchases through the merchant application on merchant device 110 and then receive a credit card from the consumer for the payment transaction. The merchant may swipe the credit card using a card reader in communication with the merchant device 110. The merchant application may then determine if the consumer is already registered in the rewards program, for example by communicating with promotional system 102.

If the consumer is a rewards program member, the consumer's rewards status may be displayed on the merchant device and the merchant application may provide special offers for the consumer based on the consumer's reward status.

If the consumer is not a rewards program member, the merchant device may provide information regarding the rewards program and provide an opportunity for the consumer to join the rewards program. If the consumer chooses to join the reward program, the consumer may input their email address thorough an email autocomplete display on the merchant device. The merchant may then complete the consumers purchase transaction and the consumer is registered in the rewards program. As a result of providing the registration opportunity prior to completing the purchase transaction, the consumer may receive immediate credit for the current transaction in their rewards account.

FIG. 4 shows an exemplary process for rewards registration independent of a payment transaction, namely process 400, that may be executed by one or more machines (some examples of which are discussed in connection with FIGS. 1 and 2 above) to provide the displays of FIGS. 16-20 discussed below, among others, in accordance with some example embodiments discussed herein. Process 400 may start at 402 with a user launching the rewards process on a device, such as a merchant device 110.

At 402, a user may begin the rewards process by, for example, selecting the rewards process from an application interface. One example of a display for a merchant application is provided by FIG. 16. A user may select an option from a menu, for example presented on a touch-sensitive display screen of a device, as presented in FIG. 16. If a merchant is not participating in a rewards program and selects the "Rewards" option 1602 from a menu, the merchant user may be presented by a promotional message regarding participating in a rewards program, such as the message displayed in display 1604 of FIG. 16. The user may then choose to register to participate in rewards programs, such as by selecting button 1606, and further described with regard to FIG. 10 below.

At 404, process 400 may receive consumer payment card data for use in determining participation in a rewards program. For example, a user may input the consumer payment card data using a magnetic card reader in communication with the merchant device. Alternatively, a user may input consumer payment card data using a keypad, such as provided by a touch-sensitive display screen included in the merchant device.

At 406, a determination may be made as to whether the consumer payment card data is registered in a rewards program. For example, the merchant device can be configured to communicate with another device, such as promotional system 102, to determine if the consumer payment card data has been registered in a rewards program for a merchant. If the consumer payment card has already been registered with the rewards program, data regarding the consumer's reward progress may be retrieved and displayed on the merchant device at 408. In some example embodiments, the consumer reward progress may further allow the merchant to acknowledge different levels of customer loyalty or enable alternative or special offers to be provided to the consumer. Upon displaying the consumer's reward progress, process 400 may continue to 422 where process 400 ends.

If at 406 it is determined that the consumer payment card is not registered in the rewards program, the merchant device may display an option for the consumer to register for the rewards program. One example of a display providing an option for the consumer to register is provided by FIG. 17. For example, a display may be provided where part of the consumer payment card data may be displayed, such as at credit card number field 1702, with the user being able to select email entry field 1704 to input the consumer's email address for registration in the rewards program, such as by tapping field 1704 on a touch-sensitive display of merchant device. Upon selection of email entry field 1702, process 400 may provide for the display of an email entry form, such as the example display provided in FIG. 18. At 410, a determination is made whether consumer has selected to register for a rewards program by completing an entry form such as provided in the example display of FIG. 17. If it is determined that a user does not wish to register for the rewards program, process 400 continues to 422 where the process ends.

If at 410 it is determined that a consumer has selected to register for the rewards program process 400 continues to 412. At 412, process 400 receives the input consumer email address for use in registering the user for the rewards program. Process 400 may then determine if the consumer email address has already has previously been registered in the rewards program at 414. For example, the merchant device can be configured to communicate with another device, such as promotional system 102, to determine if the consumer email address has previously been registered in a rewards program. If at 414 it is determined that the consumer email address has previously been registered, the consumer payment card data may be associated with that previous consumer registration at 416. Upon completion of the card data registration at 416, process 400 may continue to 422 where process ends. At 422, a notification may be provided to indicate that the consumer payment card data registration has been completed. One example of a display for notifying the process is complete is provided by FIG. 20.

If at 414 it is determined that the consumer email address has not been previously registered in the rewards program, process 400 may provide for input of a consumer's acceptance of the terms and conditions for the rewards program at 418. One example of a display for indicating acceptance of terms and conditions is provided by FIG. 19.

Upon input of acceptance of the terms and conditions, process 400 may continue to 420 to complete the registration of the consumer in the rewards program. For example, the consumer's email address and payment card data may be stored, such as at database 106 of promotional system 102. The consumer's transaction data for a merchant may also be stored in association with the consumer's email address and payment card data, such as at promotional system 102. Process 400 may continue to 422 to complete the process. At 422, a notification may be provided to indicate that the consumer registration in the rewards program has been completed. One example of a display for notifying the process is complete is provided by FIG. 20.

Optionally, upon completion of the registration of a consumer in the rewards program, previous consumer transaction data associated with the provided consumer payment card data for the merchant may be retrieved, such as from promotional database 106 or another device such as third-party system 112. The retrieved consumer transaction data may then be associated with the consumer's registration in the rewards program. For example, in some embodiments, the consumer's past transaction data may be used to apply some or all of the past transactions to the consumer's reward progress, the consumer may be offered an incentive based on the past transactions, or the like, and used as an encouragement to join the rewards program.

FIG. 5 shows an exemplary process for rewards program registration for a consumer redeeming a deal voucher, namely process 500, that may be executed by one or more machines (some examples of which are discussed in connection with FIGS. 1 and 2 above) in accordance with some example embodiments discussed herein. Process 500 may start at 502 with a merchant selecting to begin a voucher redemption for a consumer purchase transaction via a merchant device.

At 504, process 500 may receive voucher data for use in processing the redemption transaction. For example, a user may input voucher identification data using a keypad, such as provided by a touch-sensitive display screen included in the merchant device. Alternatively, a user may input voucher identification data using an optical or barcode scanner communicating with the merchant device.

At 506, redemption of the voucher may be processed. For example, the merchant device can be configured to communicate with another device, such as promotional system 102, to determine the status and current value of the voucher. The current value of the voucher may then be applied against the consumer's transaction.

At 508, the transaction payment process may be completed, such as by continuing to block 302 of FIG. 3 described above.

FIG. 6 shows an exemplary process, namely process 600, that may be executed by one or more machines (some examples of which are discussed in connection with FIGS. 1 and 2 above) in accordance with some example embodiments discussed herein. Process 600 may start at 602 with a user launching the rewards process, on a device, such as a merchant device 110, to register a consumer in a rewards program.

At 602, a user may begin the rewards registration process by, for example, selecting the rewards process from an application interface.

At 604, process 600 may receive consumer payment card data for use in registering a consumer in a rewards program. For example, a user may input the consumer payment card data using a magnetic card reader in communication with the merchant device. Alternatively, a user may input consumer payment card data using a keypad, such as provided by a touch-sensitive display screen included in the merchant device.

At 606, process 600 may receive input of a consumer identifier, such as consumer's email address, phone number, or the like, for use in registering a consumer in a rewards program. For example, a user may input the consumer's email address and/or phone number using a keypad, such as provided by a touch-sensitive display screen included in the merchant device.

At 608, a determination may be made as to whether the consumer payment card data and consumer email address has previously been registered in a rewards program. For example, the merchant device can be configured to communicate with another device, such as promotional system 102, to determine if the consumer payment card data has been registered in a rewards program for a merchant. If the consumer payment card data and consumer email address has already been registered with the rewards program, data regarding the consumer's reward progress may be retrieved and displayed on the merchant device at 610. Upon displaying the consumer's reward progress, process 600 may continue to 620 where the process ends.

If at 608 it is determined that the consumer payment card data and consumer email address is not registered in the rewards program, a determination may be made at 612 as to whether the consumer email address has previously been registered in a rewards program. If at 612 it is determined that the consumer email address has previously been registered, the consumer payment card data may be associated with that previous consumer registration at 614. Upon completion of the card data registration at 614, process 600 may continue to 620 where process ends.

If at 612 it is determined that the consumer email address has not been previously registered in the rewards program, process 600 may provide for input of a consumer's acceptance of the terms and conditions for the rewards program at 616.

Upon input of acceptance of the terms and conditions, process 600 may continue to 618 to complete the registration of the consumer in the rewards program. For example, the consumer's email address and payment card data may be stored, such as at database 106 of promotional system 102. Process 600 may continue to 620 where the process ends. In some embodiments, process 600 may also be used by a consumer to check the status of the consumer's reward progress. For example, a consumer may swipe a payment card or enter an identifier (block 604 and/or block 606) and the consumer's reward progress may be displayed (block 610).

FIG. 7 shows an exemplary process for rewards registration independent of a consumer purchase transaction, namely process 700, that may be executed by one or more machines (some examples of which are discussed in connection with FIGS. 1 and 2 above) in accordance with some example embodiments discussed herein. Process 700 may start at 702 with a user launching the rewards process, on a device, such as a merchant device 110, to register a consumer in a rewards program.

At 702, a user may begin the rewards registration process by, for example, selecting the rewards process from an application interface.

At 704, process 700 may receive input of consumer identification data, such as an email address, phone number, user name, etc., for use in registering a consumer in a rewards program. For example, a user may input the consumer's email address, phone number and/or any other identifying information using a keypad, such as provided by a touch-sensitive display screen included in the merchant device.

At 706, a determination may be made as to whether the consumer identification data has previously been registered in a rewards program. For example, the merchant device can be configured to communicate with another device, such as promotional system 102, to determine if the consumer identification data has been registered previously in a rewards program for a merchant. If the consumer identification data has already been registered with the rewards program, data regarding the consumer's reward progress may be retrieved and displayed on the merchant device at 708. Upon displaying the consumer's reward progress, process 700 may continue to 714 where the process ends.

If at 706 it is determined that the consumer identification data is not registered in the rewards program, process 706 may provide for input of a consumer's acceptance of the terms and conditions for the rewards program at 710.

Upon input of acceptance of the terms and conditions, process 700 may continue to 712 to complete the registration of the consumer in the rewards program. For example, the consumer's email address, such as at database 106 of promotional system 102. Process 700 may continue to 714 where the process ends.

FIGS. 8 and 9 show exemplary processes, namely processes 800 and 900, for registering a consumer in a reward program through the use of a messaging system, for example via SMS messaging that may be executed by one or more machines (some examples of which are discussed in connection with FIGS. 1 and 2 above) in accordance with some example embodiments discussed herein Process 800 may start at 802 with a user launching the rewards process, on a device, such as a merchant device 110, to register a consumer in a rewards program.

At 802, a user may begin the rewards registration process by, for example, selecting the rewards process from an application interface.

At 804, process 800 may receive input of a consumer's mobile device number for use in facilitating registration in a rewards program. For example, a user may input the consumer mobile device number using a keypad, such as provided by a touch-sensitive display screen included in the merchant device.

At 806, process 800 may cause a message to be sent to the consumer's mobile device, such as via SMS messaging to facilitate the consumer registering in a rewards program. The message sent to the consumer's device may comprise one or more links directing the consumer to a user interface, such as a web page or portal on a promotional system, such as promotional system 102.

Process 900 may start at 902 with a user retrieving a message on their mobile device to facilitate registration in a rewards program. The user may select a link provided within the retrieved message to connect to a user interface for registration in a rewards program.

At 904, a user interface, such as a web page, may be provided on the user's mobile device to facilitate registration in a rewards program.

At 906, input of a consumer's email address and payment card data may be received to facilitate registration in a rewards program.

At 908, a determination may be made as to whether the consumer payment card data and consumer email address has previously been registered in a rewards program. If the consumer payment card data and consumer email address has already been registered with the rewards program, data regarding the consumer's reward progress may be retrieved and displayed on the user's mobile device at 910. Upon displaying the consumer's reward progress, process 900 may continue to 920 where the process ends.

If at 908 it is determined that the consumer payment card data and consumer email address is not registered in the rewards program, a determination may be made at 912 as to whether the consumer email address has previously been registered in a rewards program. If at 912 it is determined that the consumer email address has previously been registered, the consumer payment card data may be associated with that previous consumer registration at 914. Upon completion of the card data registration at 914, process 900 may continue to 920 where the process ends.

If at 912 it is determined that the consumer email address has not been previously registered in the rewards program, process 900 may provide for input of a consumer's acceptance of the terms and conditions for the rewards program at 916.

Upon input of acceptance of the terms and conditions, process 900 may continue to 918 to complete the registration of the consumer in the rewards program. For example, the consumer's email address and payment card data may be stored, such as at database 106 of promotional system 102. Process 900 may continue to 920 where the process ends.

FIG. 10 shows an exemplary process, namely process 1000, for determining if a merchant has registered to participate in rewards programs that may be executed by one or more machines (some examples of which are discussed in connection with FIGS. 1 and 2 above) in accordance with some example embodiments discussed herein. Process 1000 may start at 1002 with a user launching the rewards process, on a device, such as a merchant device 110.

Figure 16:
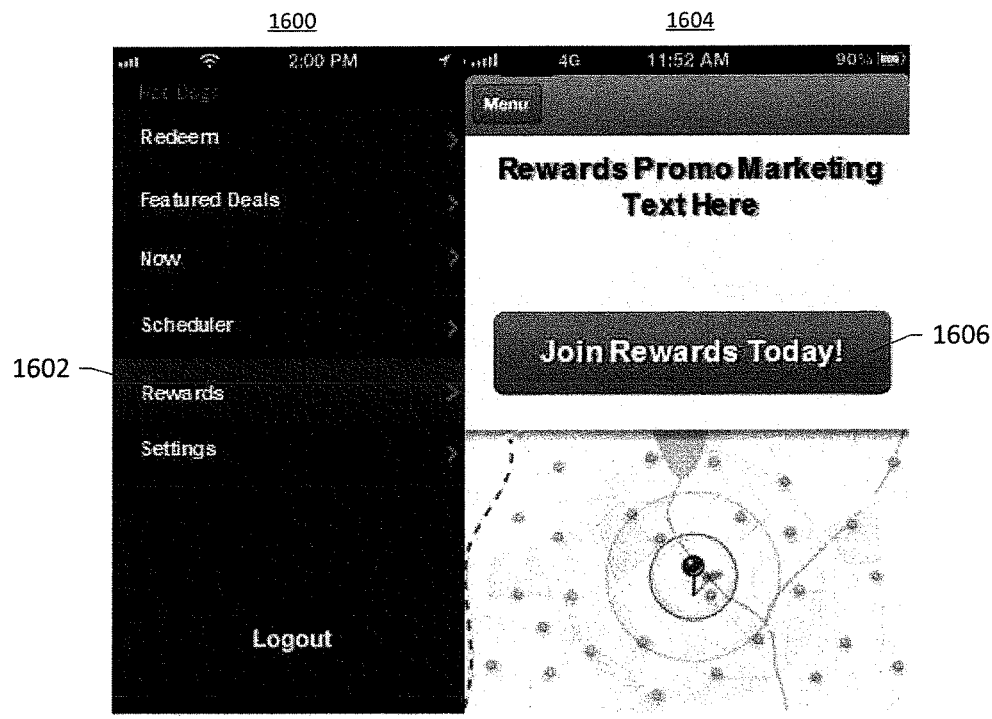
Figure 17:
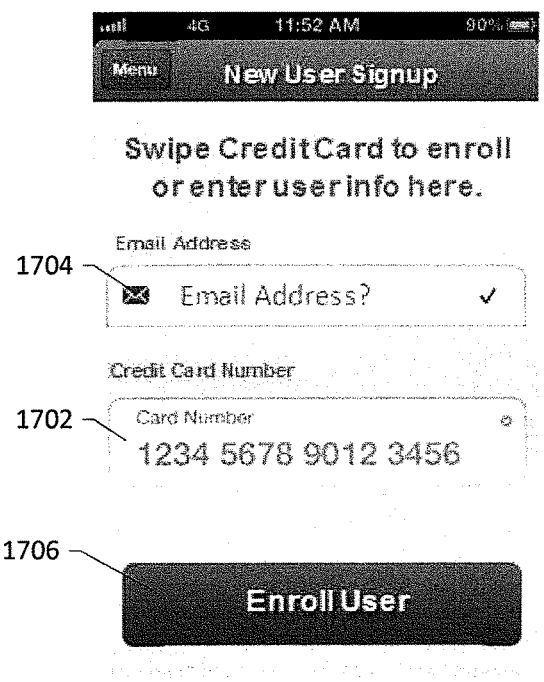

At 1002, a user may select the rewards process from an application interface, such as the example interface shown in FIG. 16. For example, a user may select the "Rewards" option 1602 from a menu presented on a touch-sensitive display screen of a device, as presented in FIG. 16.

At 1004, a determination is made as to whether the merchant user has registered to participate in rewards programs. If the merchant is a merchant participating in rewards programs, process 1000 continues to 1006 where the previously described rewards operations may be provided.

If at 1004 it is determined that a merchant is not participating in rewards programs, the merchant user may be presented with a promotional message at 1008 regarding the rewards programs, such as the message displayed by 1604 of FIG. 16.

At 1010, the merchant user may then select to register to participate in rewards programs, such as by selecting button 1606 of FIG. 16.

At 1012, a determination may be made as to whether or not the merchant user participates in a payment system, such as may be provided by promotional system 102. If the merchant user does participate in the payment system, process 1000 continues to 1014 where the merchant user may activate their registration in rewards programs.

If at 1012, a determination is made that the merchant user is a Non-Payments Merchant, process 1000 continues to 1016 where the merchant is redirected to the Payments registration process.

FIGS. 11-20 show example displays that may be presented by one or more display screens of one or more merchant devices in accordance with some embodiments discussed herein. The displays of FIGS. 11-20 can be used to provide a relatively simple, quick, and intuitive way for the merchant to process a consumer's rewards program registration.

Although the displays of FIGS. 11-20 are shown as being optimized for a touch-sensitive device, the functionality discussed in connection with the displays of FIGS. 11-20 may be provided by one or more machines having any suitable display screen in accordance with embodiments discussed herein. For example, the display may be provided by a machine that has a non-touch-sensitive display and a mouse and/or other input component (such as, e.g., a touch pad, keyboard, camera, etc.).

FIG. 11 shows an exemplary presentation of a Transaction Checkout Display in accordance with some example embodiments discussed herein. The Transaction Checkout Display may be presented to a user upon launching a payment and redemption application as described in accordance with some example embodiments discussed herein. The Transaction Checkout Display may provide a user interface for a merchant device to receive transaction data to facilitate payment and redemption.

FIG. 12 shows an exemplary presentation of a Consumer Authorization Display for a consumer that is already registered in a rewards program, in accordance with some example embodiments discussed herein. The Consumer Authorization Display may provide an indication a consumer's reward status 1202 and a customer authorization field 1204.

FIG. 13 shows an exemplary presentation of a Consumer Authorization Display for a consumer that is not registered in a rewards program, in accordance with some example embodiments discussed herein. The Consumer Authorization Display may provide a selection checkbox 1302 to indicate a consumer's desire to register for a rewards program and a customer authorization field 1304.

Figure 14:
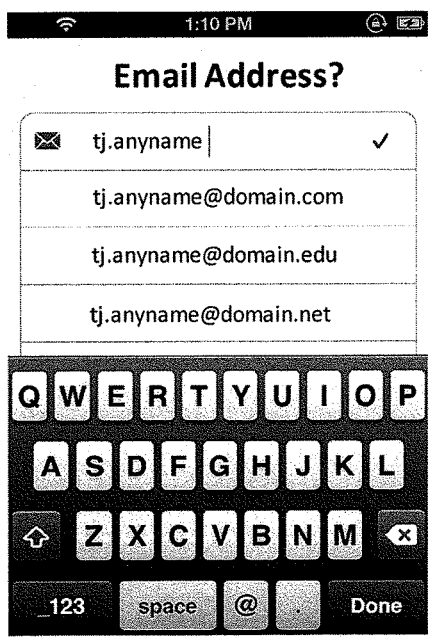

FIG. 14 shows an exemplary presentation of a Consumer Email Address Input Display for use in facilitating registration in a rewards program. A user may input a consumer's email address such as by using the keypad of a touch-sensitive display screen.

Figure 15:

FIG. 15 shows an exemplary presentation of a Registration Confirmation Display, in accordance with some example embodiments discussed herein, which may be presented on a device, such as a merchant device, to confirm the registration of a consumer is a rewards program.

FIG. 16 shows an exemplary presentation of a Merchant Menu Display 1600 and a Rewards Promotional Display 1604, in accordance with some example embodiments discussed herein. A user may use the menu interface of Merchant Menu Display 1600 to initiate various process, such as selecting by "Rewards" 1602 to initiate the merchant rewards processes. If a merchant user selects "Rewards" 1602 and is not currently registered to participate in rewards programs, Rewards Promotional Display 1604 may be provided to allow the merchant user to register to participate by selecting button 1606.

FIG. 16 shows an exemplary presentation of a New User Signup Display, in accordance with some example embodiments discussed herein, which may be presented to a user to facilitate registration of a consumer in a rewards program. Email Address field 1704 may be used to initiate the Email Address Input Display of FIG. 18 and to display the email address that was input through the Email Address Input Display. Credit Card Number field 1702 may display part of the consumer payment card data that was received as part of the consumer registration process. Button 1706 may be used to indicate completion of the consumer data input for registration of the consumer in the rewards program.

Figure 18:
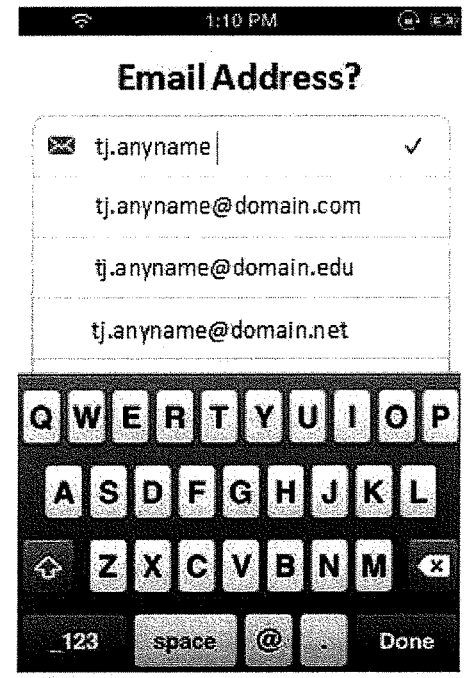

FIG. 18 shows an exemplary presentation of an Email Address Input Display for use in facilitating registration in a rewards program, in accordance with some example embodiments discussed herein. A user may input a consumer's email address such as by using the keypad of a touch-sensitive display screen.

Figure 19:
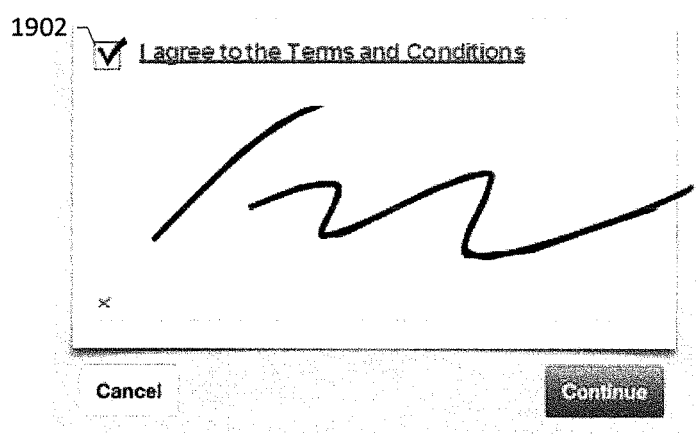

FIG. 19 shows an exemplary presentation of a Consumer Acceptance Display to receive input of a consumer's acceptance of the terms and conditions for a rewards program, in accordance with some example embodiments discussed herein. The Consumer Acceptance Display may provide a selection checkbox 1902 to indicate a consumer's acceptance of the terms and conditions of the rewards program.

Figure 20:

FIG. 20 shows an exemplary presentation of a Registration Confirmation Display, in accordance with some example embodiments discussed herein, which may be presented on a device, such as a merchant device, to confirm the registration of a consumer is a rewards program.

As described above and as will be appreciated based on this disclosure, embodiments of the present invention may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

Embodiments of the present invention have been described above with reference to block diagrams and flowchart illustrations of methods, apparatuses, systems and computer program products. It will be understood that each block of the circuit diagrams and process flowcharts, and combinations of blocks in the circuit diagrams and process flowcharts, respectively, can be implemented by various means including computer program instructions. These computer program instructions may be loaded onto a general purpose computer, special purpose computer, or other programmable data processing apparatus, such as processor 202 and/or rewards module 210 discussed above with reference to FIG. 2, to produce a machine, such that the computer program product includes the instructions which execute on the computer or other programmable data processing apparatus create a means for implementing the functions specified in the flowchart block or blocks.

These computer program instructions may also be stored in a computer-readable storage medium (e.g., memory 204) that can direct a computer or other programmable data processing apparatus to function in a particular manner, such that the instructions stored in the computer-readable storage medium produce an article of manufacture including computer-readable instructions for implementing the function discussed herein. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions discussed herein.

Accordingly, blocks of the block diagrams and flowchart illustrations support combinations of means for performing the specified functions, combinations of steps for performing the specified functions and program instruction means for performing the specified functions. It will also be understood that each block of the circuit diagrams and process flowcharts, and combinations of blocks in the circuit diagrams and process flowcharts, can be implemented by special purpose hardware-based computer systems that perform the specified functions or steps, or combinations of special purpose hardware and computer instructions.

Many modifications and other embodiments of the inventions set forth herein will come to mind to one skilled in the art to which these embodiments of the invention pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. An apparatus comprising at least one processor and at least one memory, the at least one memory including computer program instructions which when executed, in conjunction with the at least one processor, are configured to cause the apparatus to:
 receive client transactional data for a transactional session from a merchant device associated with a merchant, wherein the client transactional data comprises a provider identifier associated with the merchant and a transactional account identifier;
 query one or more promotional system databases for one or more provider accounts and transactional accounts based on at least the transactional account identifier and the provider identifier;
 generate a provider eligibility status for the transactional session based on whether a provider account associated with the provider identifier conforms to one or more provider eligibility criteria;
 generate an account eligibility status for the transactional account identifier based on whether a transactional account associated with the transactional account identifier conforms to one or more transactional account eligibility criteria;
 select a first dynamic interface from one or more candidate dynamic interfaces associated with a dynamic graphical user interface based on at least the provider eligibility status and the account eligibility status, wherein the selected first dynamic interface is configured for presentation on a display of the merchant device, the selected first dynamic interface including a first region defining an authorization input user interface and a second region defining a reward program user interface, the second region configured to be updated in real time based on the account eligibility status, and wherein selecting the first dynamic interface comprises:
 in response to determining that the provider eligibility status indicates that the provider account conforms to the one or more provider eligibility criteria and that the transactional account does not conform to the one or more transactional account eligibility criteria, selecting the first dynamic interface wherein the second region is dynamically updated with an account registration interface, and wherein the account registration interface is generated based on whether a client account associated with a client account identifier for the transactional session conforms to one or more client account eligibility criteria; and
 in response to determining that the provider eligibility status indicates that the provider account conforms to the one or more provider eligibility criteria and that the transactional account conforms to the one or more transactional account eligibility criteria, selecting the first dynamic interface such that the second region is dynamically updated with a reward redemption finalization interface;
 generate the selected first dynamic interface, wherein generating the selected first dynamic interface such that the second region is dynamically updated with the account registration interface comprises:
in response to determining that the client account does not conform to the one or more client account eligibility criteria, generating a sequential presentation in the second region of the selected first dynamic interface of a registration window and an account identifier input window; and
in response to determining that the client account conforms to the one or more client account eligibility criteria, generating a transactional linking window in the second region of the selected first dynamic interface; and
transmit the generated first dynamic interface to the merchant device for presentation using the display of the merchant device.

2. The apparatus of claim 1, wherein the transactional account identifier is associated with a voucher data object.

3. The apparatus of claim 1, wherein the transactional account identifier is associated with a payment card data object.

4. The apparatus of claim 1, wherein the client transactional data is generated based on user interaction with a transactional input interface associated with the merchant device.

5. The apparatus of claim 1, wherein the client transactional data is generated based on consumer payment card data received via a magnetic reader device associated with the merchant device.

6. The apparatus of claim 1, wherein the account identifier input window is configured to receive input of consumer identifier data.

7. The apparatus of claim 6, wherein the computer program instructions, when executed, in conjunction with the at least one processor, are further configured to cause the apparatus to:
receive consumer identifier data, the consumer identifier data comprising one or more consumer identifiers;
determine whether at least one of the one or more consumer identifiers conforms to one or more consumer account eligibility criteria; and
in response to determining that at least one of the one or more consumer identifiers conforms to the one or more consumer account eligibility criteria, generate an updated account eligibility status and associate the transactional account identifier with an existing consumer account.

8. The apparatus of claim 7, wherein the second region of the first dynamic interface is dynamically updated with the reward redemption finalization interface.

9. The apparatus of claim 7, wherein the computer program instructions, when executed, in conjunction with the at least one processor, are further configured to cause the apparatus to:
in response to determining that the one or more consumer identifiers do not conform to the one or more consumer account eligibility criteria, generate a new consumer account and associate the transactional account identifier and the one or more consumer identifiers with the new consumer account.

10. The apparatus of claim 9, wherein the computer program instructions, when executed, in conjunction with the at least one processor, are further configured to cause the apparatus to:
query the one or more promotional system databases for historical transaction data associated with one or more of the transactional account identifier and the one or more consumer identifiers; and
associate the historical transaction data returned by the query with the new consumer account.

11. The apparatus of claim 1, wherein the computer program instructions, when executed, in conjunction with the at least one processor, are further configured to cause the apparatus to:
receive a mobile device number identifier, wherein the mobile device number identifier is detected as input associated with the the account registration interface; and
cause transmission of a message to a mobile device associated with the mobile device number identifier, wherein the message comprises one or more links directing a user of the mobile device to a user interface associated a promotional system.

12. The apparatus of claim 1, wherein the computer program instructions, when executed, in conjunction with the at least one processor, are configured to cause the apparatus to:
in response to determining that the provider eligibility status indicates that the provider account does not conform to the one or more provider eligibility criteria, generate a provider account promotion window, the provider account promotion window configured for presentation on the display of the merchant device, wherein the provider account promotion window is further configured to provide provider account registration access to the merchant associated with the merchant device.

13. A computer-implemented method comprising:
receiving client transactional data for a transactional session from a merchant device associated with a merchant, wherein the client transactional data comprises a provider identifier associated with the merchant and a transactional account identifier;
querying one or more promotional system databases for one or more provider accounts and transactional accounts based on at least the transactional account identifier and the provider identifier;
generating a provider eligibility status for the transactional session based on whether a provider account associated with the provider identifier conforms to one or more provider eligibility criteria;
generating an account eligibility status for the transactional account identifier based on whether a transactional account associated with the transactional account identifier conforms to one or more transactional account eligibility criteria;
selecting a first dynamic interface from one or more candidate dynamic interfaces associated with a dynamic graphical user interface based on at least one of the provider eligibility status and the account eligibility status, wherein the selected first dynamic interface is configured for presentation on a display of the merchant device, the selected first dynamic interface including a first region defining an authorization input user interface and a second region defining a reward program user interface, the second region configured to be updated in real time based on the account eligibility status, and wherein selecting the first dynamic interface comprises:
in response to determining that the provider eligibility status indicates that the provider account conforms to the one or more provider eligibility criteria and that the transactional account does not conform to the one or more transactional account eligibility criteria, selecting the first dynamic interface wherein the second region is dynamically updated with an account registration interface, wherein the account registration interface is generated based on whether a client account associated with a client account identifier for the transactional session conforms to one or more client account eligibility criteria; and in response to determining that the provider eligibility status indicates that the provider account conforms to the one or more provider eligibility criteria and that the transactional account conforms to the one or more transactional account eligibility criteria, selecting the first dynamic interface wherein the second region is dynamically updated with a reward redemption finalization interface;

generating the selected first dynamic interface, wherein generating the first dynamic interface such that the second region is dynamically updated with the account registration interface comprises:

in response to determining that the client account does not conform to the one or more client account eligibility criteria, generating a sequential presentation in the second region of the selected first dynamic interface of a registration window and an account identifier input window; and in response to determining that the client account conforms to the one or more client account eligibility criteria, generating a transactional linking window in the second region of the selected first dynamic interface; and transmitting the generated first dynamic interface to the merchant device for presentation using the display of the merchant device.

14. The computer-implemented method of claim 13, wherein the transactional account identifier is associated with a voucher data object.

15. The computer-implemented method of claim 13, wherein the transactional account identifier is associated with a payment card data object.

16. The computer-implemented method of claim 13, wherein the client transactional data is generated based on user interaction with a transactional input interface associated with the merchant device.

17. A computer program product comprising a non-transitory computer readable storage medium and computer program instructions stored therein, the computer program instructions comprising program instructions configured to:

receive client transactional data for a transactional session from a merchant device associated with a merchant, wherein the client transactional data comprises a provider identifier associated with the merchant and a transactional account identifier;

query one or more promotional system databases for one or more provider accounts or transactional accounts based on at least the transactional account identifier and the provider identifier;

generate a provider eligibility status for the transactional session based on whether a provider account associated with the provider identifier conforms to one or more provider eligibility criteria;

generate an account eligibility status for the transactional account identifier based on whether a transactional account associated with the transactional account identifier conforms to one or more transactional account eligibility criteria;

select a first dynamic interface from one or more candidate dynamic interfaces associated with a dynamic graphical user interface based on at least one of the provider eligibility status and the account eligibility status, wherein the selected first dynamic interface is configured for presentation on a display of the merchant device, the selected first dynamic interface including a first region defining an authorization input user interface and a second region defining a reward program user interface, the second region configured to be updated in real time based on the account eligibility status, and wherein selecting the first dynamic interface comprises:

in response to determining that the provider eligibility status indicates that the provider account conforms to the one or more provider eligibility criteria and that the transactional account does not conform to the one or more transactional account eligibility criteria, selecting the first dynamic interface wherein the second region is dynamically updated with an account registration interface, wherein the account registration interface is generated based on whether a client account associated with a client account identifier for the transactional session conforms to one or more client account eligibility criteria; and in response to determining that the provider eligibility status indicates that the provider account conforms to the one or more provider eligibility criteria and that the transactional account conforms to the one or more transactional account eligibility criteria, selecting the first dynamic interface wherein the second region is dynamically updated with a reward redemption finalization interface;

generate the selected first dynamic interface, wherein generating the selected first dynamic interface such that the second region is dynamically updated with the account registration interface comprises:

in response to determining that the client account does not conform to the one or more client account eligibility criteria, generating a sequential presentation in the second region of the selected first dynamic interface of a registration window and an account identifier input window; and in response to determining that the client account conforms to the one or more client account eligibility criteria, generating a transactional linking window in the second region of the selected first dynamic interface; and transmit the generated first dynamic interface to the merchant device for presentation using the display of the merchant device.

\* \* \* \* \*